Dec. 8, 1925.
F. C. JONES
1,564,310
PROCESS FOR MOLDING RUBBER ARTICLES
Filed May 15, 1922
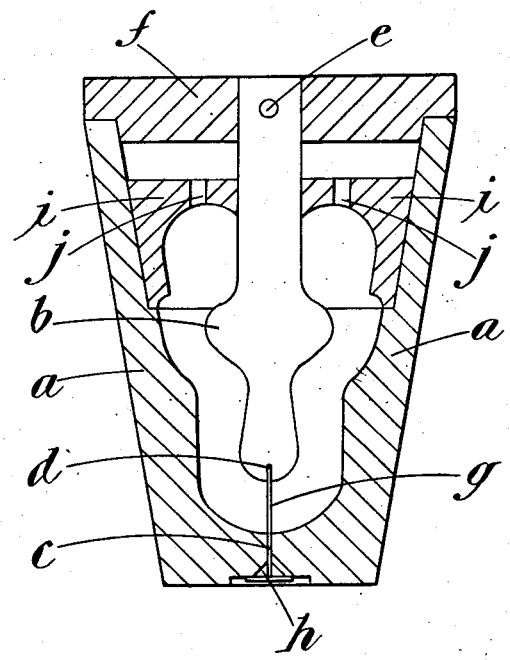
Inventor:
Fordyce Charles Jones,
by
Attorney.

Patented Dec. 8, 1925.

1,564,310

UNITED STATES PATENT OFFICE.

FORDYCE CHARLES JONES, OF LONDON, ENGLAND.

PROCESS FOR MOLDING RUBBER ARTICLES.

Application filed May 15, 1922. Serial No. 561,130.

*To all whom it may concern:*

Be it known that I, FORDYCE CHARLES JONES, a subject of the King of Great Britain and Ireland, and a resident of London, England, have invented a certain new and useful Improvement in Processes for Molding Rubber Articles, of which the following is a specification.

My invention relates to the manufacture of rubber articles commonly known as "dipped goods", such as teats, syringes, tubing, bulbs and the like, and has for its object a simple and expeditious method of producing such articles without any seam or mold mark.

According to my invention, I take a solution of rubber or rubber compound and vulcanize it to a gel by means of the "Peachey" process (according to which the rubber solution is treated with sulphur dioxide and hydrogen sulphide) or by any other suitable process, wherein the gel substantially shrinks when drying out. This solution is molded on to a core, the essence of the invention residing in allowing a gel of the type specified to shrink on to a core.

The gel is preferably poured into a mold whose internal surface has a suitable configuration somewhat as the external surface of the article to be finished, but is larger. An alternative mode of varying the resultant sectional configuration of the molded article is hereinafter described.

The mold is adapted to receive a core which is removed with the gel formed thereon. The size of the space between the core and the internal surface of the mold is so proportioned that sufficient rubber is obtained on the core to provide for the substance of the finished article. The core with its coating of rubber is then set aside to dry and contract and then the molded article, which has been shrunk on to the core, may be removed therefrom.

A diagrammatic cross-section of such mold and core is shown in the accompanying drawing.

In the drawing, $a$ is the mold, and $b$ the core.

In molding of this description it is essential that the core $b$ be exactly centered to the mold $a$, otherwise the resultant article presents defects.

The present invention provides also a device wherein the centering of the core is materially assisted, said device also being combined with means to facilitate the removal of the core and gel from the mold.

Such centering device is particularly applicable to articles such as teats, wherein it is desirable to mold a pin hole at the top and according thereto I construct a small aperture $c$ central of the base of the mold $a$, and also form a recess $d$ central of the tip of the core $b$, the aperture and recess being coaxial when the core is positioned in the mold. I mount the core detachably, by a transverse pin $e$ through the core spindle (which is mounted in a dead-central aperture in the cover $f$), in the said cover $f$, and the latter snugly fits into the mouth of the mold $a$. When the gel solution is poured into the mold and the core inserted a slender pin $g$ is inserted through the aperture, through the gel, and into the recess $d$ of the core. When ready for removal of the core, the pin $e$ is extracted and the aperture in the mold utilized for the accommodation of the nozzle of a water, steam, compressed air, or other device to assist removal of the core. Any suitable means may be employed for this purpose, and I show simply a recess $h$ to accommodate said nozzle.

With a mold and core of this description I may desire to form a contracted neck towards the top of the molding, and so that the enlargement in the middle of the molding may be removed from the mold I insert a removable ring $i$ in the top of the mold to form the contracted neck. Said ring $i$ has a central orifice to slide over the stem of the core $b$ and a plurality of small passages $j$ to allow passage of solution therethrough.

The mold $a$ may be formed of somewhat resilient material such as rubber, or any suitable cellulose or other compound, with a flexible neck. Or it may be constructed practically entirely rigid with a flexible neck.

In a modification, the inner contour of the mold member $a$ need not necessarily be shaped to determine the outer configuration of the resultant molding, but such configuration may be obtained, as also a varying thickness of the molded article, by pouring different layers of strata of the gel solution of various strengths of solution. That is to say, by way of example, if a bottom quantity of an eight per cent solution is first poured in, then an upper portion of a 12 per cent solution, the latter will dry out, when shrunk, thicker than the former and with a pronounced exterior bulge.

In a further manner of carrying out the invention, I may use a mold made of fusible metal, gelatine, paper, or other destructible substance capable of being removed in its entirety from the shaped gel after any intricate or other shape has been formed. For instance, a collodion mold could be filled with solution, core inserted, and after the gel had set, such collodion cover could be broken or dissolved off, leaving the shaped gel to shrink on to the core.

I claim:—

The method of molding rubber or rubber-containing articles consisting of pouring layers of self-vulcanizing rubber-containing solutions of different strength into the space between an exterior mold and an interior core to obtain requisite contours and thicknesses of the resulting molded article, and allowing the same to gel while confined within said space.

In testimony whereof I have affixed my signature hereto this 10th day of April 1922.

FORDYCE CHARLES JONES.